(12) United States Patent
Boudard et al.

(10) Patent No.: US 7,634,978 B2
(45) Date of Patent: Dec. 22, 2009

(54) DEVICE FOR CONTROLLING THE TEMPERATURE OF FLUIDS CIRCULATING IN A HEAT ENGINE VEHICLE AND METHOD USED BY SAID DEVICE

(75) Inventors: Emmanuel Boudard, Voisins le Bretonneux (FR); Armel Le Lievre, Montesson (FR); Mathieu Bartoletti, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 274 days.

(21) Appl. No.: 10/596,775

(22) PCT Filed: Dec. 22, 2004

(86) PCT No.: PCT/FR2004/003347

§ 371 (c)(1),
(2), (4) Date: Sep. 19, 2006

(87) PCT Pub. No.: WO2005/064133

PCT Pub. Date: Jul. 14, 2005

(65) Prior Publication Data

US 2007/0137594 A1 Jun. 21, 2007

(30) Foreign Application Priority Data

Dec. 23, 2003 (FR) .................................. 03 15272

(51) Int. Cl.
*F01P 1/08* (2006.01)
*F01P 11/02* (2006.01)
*F01N 5/02* (2006.01)

(52) U.S. Cl. ................... 123/41.31; 123/41.14; 165/51; 165/52

(58) Field of Classification Search .............. 123/41.01, 123/41.02, 41.14, 41.31, 41.33, 41.51, 196 AB; 60/320, 912; 165/51, 52, 104.12
See application file for complete search history.

(56) References Cited

U.S. PATENT DOCUMENTS 5,215,044 A 6/1993 Banzhaf et al.

(Continued)

FOREIGN PATENT DOCUMENTS

DE 29 27 680 A1 * 1/1981

(Continued)

OTHER PUBLICATIONS

International Search Report dated Jun. 21, 2005 in PCT/FR2004/003347.

*Primary Examiner*—Michael Cuff
*Assistant Examiner*—Ka Chun Leung
(74) *Attorney, Agent, or Firm*—Nicolas E. Seckel

(57) ABSTRACT

The invention relates to a control device (D) which is intended to control the temperature of first and second fluids formed by the lubricating oil of the heat engine (12) of the vehicle and the recirculated exhaust gases respectively. The inventive device (D) comprises a first heat transfer liquid/lubricating oil exchanger (14) and a second heat-transfer liquid/recirculated exhaust gases exchanger (16), said first and second exchangers being connected to the same heat transfer liquid circuit (10). Preferably, the heat-transfer liquid circuit (10) is connected to a heat source or a heat sink (18) comprising, for example, heat storage means (18) which can exchange heat with the heat-transfer liquid.

16 Claims, 2 Drawing Sheets

U.S. PATENT DOCUMENTS

| | | |
|---|---|---|
| 5,730,089 A | 3/1998 | Aoki et al. |
| 6,772,715 B2 * | 8/2004 | Pfeffinger et al. ........ 123/41.31 |
| 2003/0089319 A1 | 5/2003 | Klingebiel et al. |

FOREIGN PATENT DOCUMENTS

| | | |
|---|---|---|
| DE | 4032701 A | 6/1992 |
| DE | 19521292 A | 12/1996 |
| DE | 19750721 A1 | 5/1999 |
| EP | 0593942 A | 4/1994 |

* cited by examiner

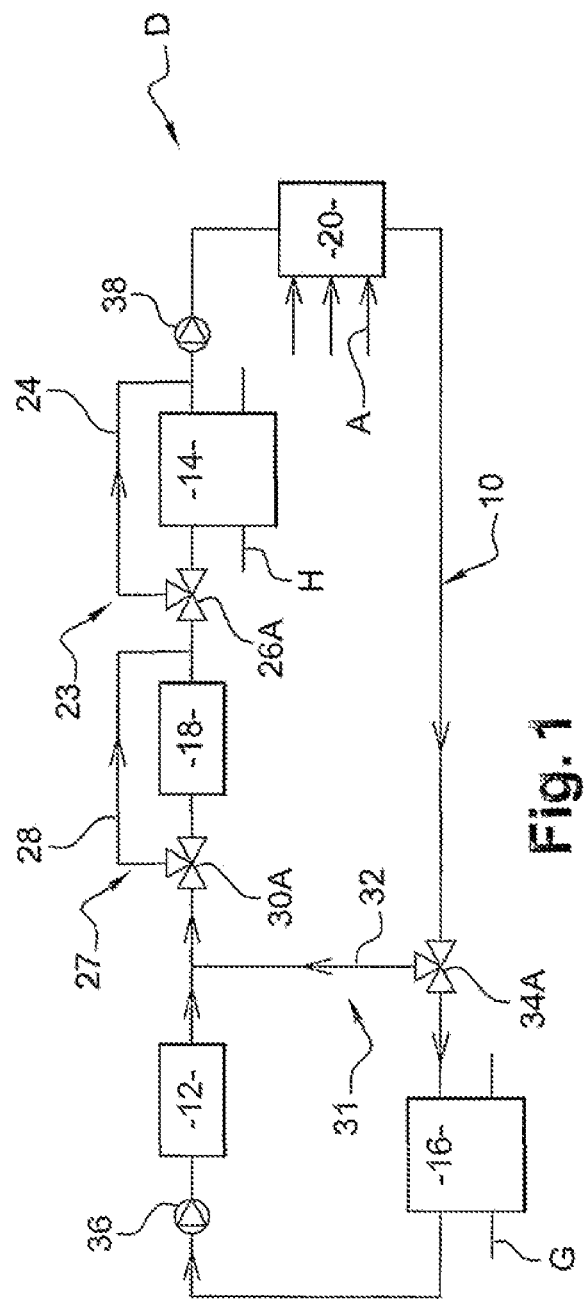
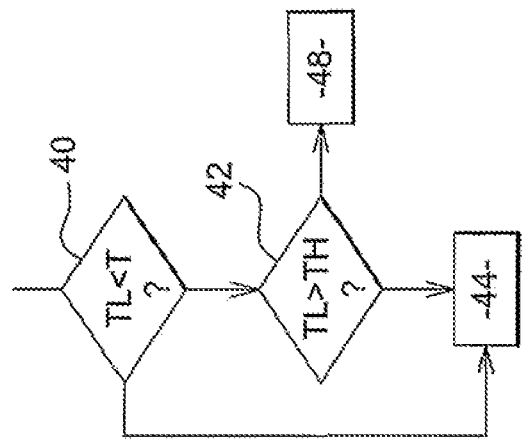
Fig. 1
Fig. 2

DEVICE FOR CONTROLLING THE TEMPERATURE OF FLUIDS CIRCULATING IN A HEAT ENGINE VEHICLE AND METHOD USED BY SAID DEVICE

The present invention concerns a device for controlling the temperature of fluids circulating in a heat engine vehicle and a method implemented by this device.

The invention applies in particular to the control of the temperature of fluids circulating in a vehicle so as to participate in the operation of a diesel engine.

A device for controlling the temperature of fluids circulating in a heat engine vehicle, which is already known in the art, is of the type comprising a circuit in which a heat-transfer liquid for cooling the heat engine circulates, and at least one heat-transfer liquid/fluid to be controlled heat exchanger.

This type of device can be used to warm up the lubricating oil of an engine.

Indeed, at low temperature, the lubricating oil of the heat engine has a high viscosity, which leads to additional frictions within the engine, and consequently, an overconsumption of fuel. This occurs in particular during start-up of the vehicle, when the heat engine and the oil are cold.

It is known to use a heat-transfer liquid/lubricating oil heat exchanger to accelerate the temperature rise of the oil during start-up.

The above-mentioned type of device can also be used to reduce the amount of nitrogen oxides emitted by the vehicle.

Indeed, the production of nitrogen oxides (NOx) is linked in particular to the temperature of the gas mixture introduced into the cylinders of the heat engine of the vehicle. The higher the temperature of the mixture, the larger the production of nitrogen oxides. The gas mixture introduced into the cylinders comprises in particular the intake air, and, possibly, exhaust gases recirculated with the intake air. These exhaust gases are usually called EGR (Exhaust Gas Recycling).

By lowering the temperature of the recirculated gases, for example, with a heat-transfer liquid/recirculated exhaust gases heat exchanger, the temperature of the gas mixture introduced into the cylinders is lowered, which reduces the production of nitrogen oxides accordingly.

Thus, it is known to use a temperature control device comprising at least one heat-transfer liquid/fluid heat exchanger, in some vehicles, to warm up the lubricating oil, and in other vehicles, to cool down recirculated exhaust gases.

In order to reduce costs, it is desirable to provide means that are as simple and as effective as possible to implement the control of the temperatures of the fluids mentioned above.

To this aim, an object of the invention is a device for controlling the temperature of fluids circulating in a heat engine vehicle, of the type mentioned above, characterized in that it is intended to control the temperature of first and second fluids formed by lubricating oil of the heat engine of the vehicle and by recirculated exhaust gases, respectively, and in that it comprises:

a first heat-transfer liquid/lubricating oil exchanger,
a second heat-transfer liquid/recirculated exhaust gases exchanger, the first and second exchangers being connected to a same heat-transfer liquid circuit.

Such a device makes it possible to reduce effectively the fuel overconsumption during start-up of the vehicle, and makes it possible also to reduce markedly the production of nitrogen oxides. It is easy to implement since it uses the heat-transfer liquid circuit for cooling the engine, with which the vehicle is usually equipped.

A temperature control device according to the invention can comprise additionally one or several of the following characteristics:

the heat-transfer liquid circuit is connected to a heat source or to a heat sink;

the heat source or the heat sink comprises heat storage means that can exchange heat with the heat-transfer liquid, in particular during a heating mode, in which the heat from the storage means is transferred to the heat-transfer liquid, and during a regeneration mode, in which the heat from the heat-transfer liquid is transferred to the storage means;

the heat storage means comprise a chemical compound that stores or releases heat energy by changing phases;

the two exchangers and the heat source or the heat sink are connected in series in the heat-transfer liquid circuit, in the order: heat source or heat sink, heat-transfer liquid/oil exchanger, heat-transfer liquid/recirculated exhaust gases exchanger, considering the direction of circulation of the heat-transfer liquid in the circuit;

the heat-transfer liquid circuit comprises derivation means from the heat-transfer liquid/oil exchanger;

the derivation means from the heat-transfer liquid/oil exchanger comprise a derivation branch from the heat-transfer liquid/oil exchanger and a three-way valve comprising first and second channels of the same signs connected, one to the exchanger, and the other, to the derivation branch from the heat-transfer liquid/oil exchanger, and a third channel of the sign opposed to that of the former connected to the circuit;

the derivation means from the heat-transfer liquid/oil exchanger comprise a four-way valve comprising two channels of opposed signs connected to the heat-transfer liquid/oil exchanger and two channels of opposed signs connected to the heat-transfer liquid circuit;

in which the heat-transfer liquid circuit comprises derivation means from the heat source or from the heat sink;

the derivation means from the heat source or from the heat sink comprise a derivation branch from the heat source or from the heat sink and a three-way valve comprising first and second channels of the same signs connected, one to the heat source or to the heat sink, and the other, to the derivation branch from the heat source or from the heat sink, and a third channel of the sign opposed to that of the former connected to the circuit;

the derivation means from the heat source or from the heat sink comprise a four-way valve comprising two channels of opposed signs connected to the heat source or to the heat sink and two channels of opposed signs connected to the heat-transfer liquid circuit;

the heat-transfer liquid circuit comprises derivation means from the engine;

the derivation means from the engine comprise a derivation branch from this engine and a three-way valve comprising first and second channels of the same signs connected, one to the engine, and the other, to the derivation branch of this engine, and a third channel of the sign opposed to that of the former connected to the circuit;

the derivation means from the engine comprise a four-way valve comprising two channels of opposed signs connected to the engine and two channels of opposed signs connected to the circuit;

the heat-transfer liquid circuit is connected additionally to heat exchange means between the heat-transfer liquid and the air of a passenger compartment of the vehicle;

the heat-transfer liquid circuit is connected additionally to an electric pump capable of circulating the heat-transfer liquid in at least a portion of the circuit, in particular when the engine is off.

Another object of the invention is a method for controlling the temperature of fluids implemented by the device according to the invention, characterized in that it comprises the following steps:

raising the temperatures of the oil and of the heat-transfer liquid and determining whether the temperature of the oil is lower than a predetermined temperature (first condition), if this first condition is met, determining whether the temperature of the heat-transfer liquid is higher than the temperature of the oil (second condition), If the second condition is met, adjusting the amounts of the heat-transfer liquid and of the oil circulating in the exchanger so as to promote heating of the oil through heat exchange with the relatively hot heat-transfer liquid, If the second condition is not met, adjusting the amounts of the heat-transfer liquid and of the oil circulating in the exchanger so as to avoid or minimize the heat exchange between the oil and the relatively cold heat-transfer liquid, if the first condition is not met, adjusting the amounts of the heat-transfer liquid and of the oil circulating in the exchanger so as to promote cooling of the oil.

Another object of the invention is a method for controlling the temperature of fluids implemented by the device according to the invention, characterized in that it comprises circulating the heat-transfer liquid both in the heat-transfer liquid/recirculated exhaust gases exchanger and in the heat storage means, and this independently from the operation in heating mode or in regeneration mode of these storage means.

Another object of the invention is a method for controlling the temperature of fluids implemented by the device according to the invention, characterized in that it comprises, the heat storage means being in regeneration mode and the engine being on, adjusting the amount of the heat-transfer liquid circulating in the heat storage means so as to avoid or minimize the heat exchange between the heat storage means in the regeneration mode and the heat-transfer liquid.

Still another object of the invention is a method for controlling the temperature of fluids implemented by the device according to the invention, characterized in that it comprises, the heat storage means being in heating mode and the engine being off or operating at idle speed after a period at a higher speed:

if at least one condition among a first category of condition(s) is met, adjusting the amount of heat-transfer liquid circulating in the heat storage means so as to avoid or minimize the heat exchange between the heat storage means in the heating mode and the heat-transfer liquid, if at least one condition among a second category of condition(s) is met, adjusting the amount of heat-transfer liquid circulating in the heat storage means so as to promote heating of the heat-transfer liquid through heat exchange with these storage means.

The above temperature control method according to the invention can additionally comprise one or several of the following characteristics:

the first category of condition(s) comprises a voluntary order to turn off the engine by a user;

the second category of condition(s) comprises an order to turn off the engine by a computer of the vehicle, a triggering of emergency lights of the vehicle accompanying turn-off of the engine, a dysfunction of the vehicle necessitating turn-off of the engine, and an order to heat the air of the passenger compartment in anticipation of start-up of the engine.

The invention will be better understood by reading the following description, which is given as an example only, by reference to the drawings in which:

FIG. 1 is a schematic view of a device according to a first embodiment of the invention for controlling the temperature of fluids circulating in a heat engine vehicle;

FIG. 2 is a flow chart of a method implemented by the device shown on FIG. 1;

FIG. 1 shows a device D according to a first embodiment of the invention for controlling the temperature of fluids circulating in a heat engine vehicle, for example, of the diesel type.

Figure 3:
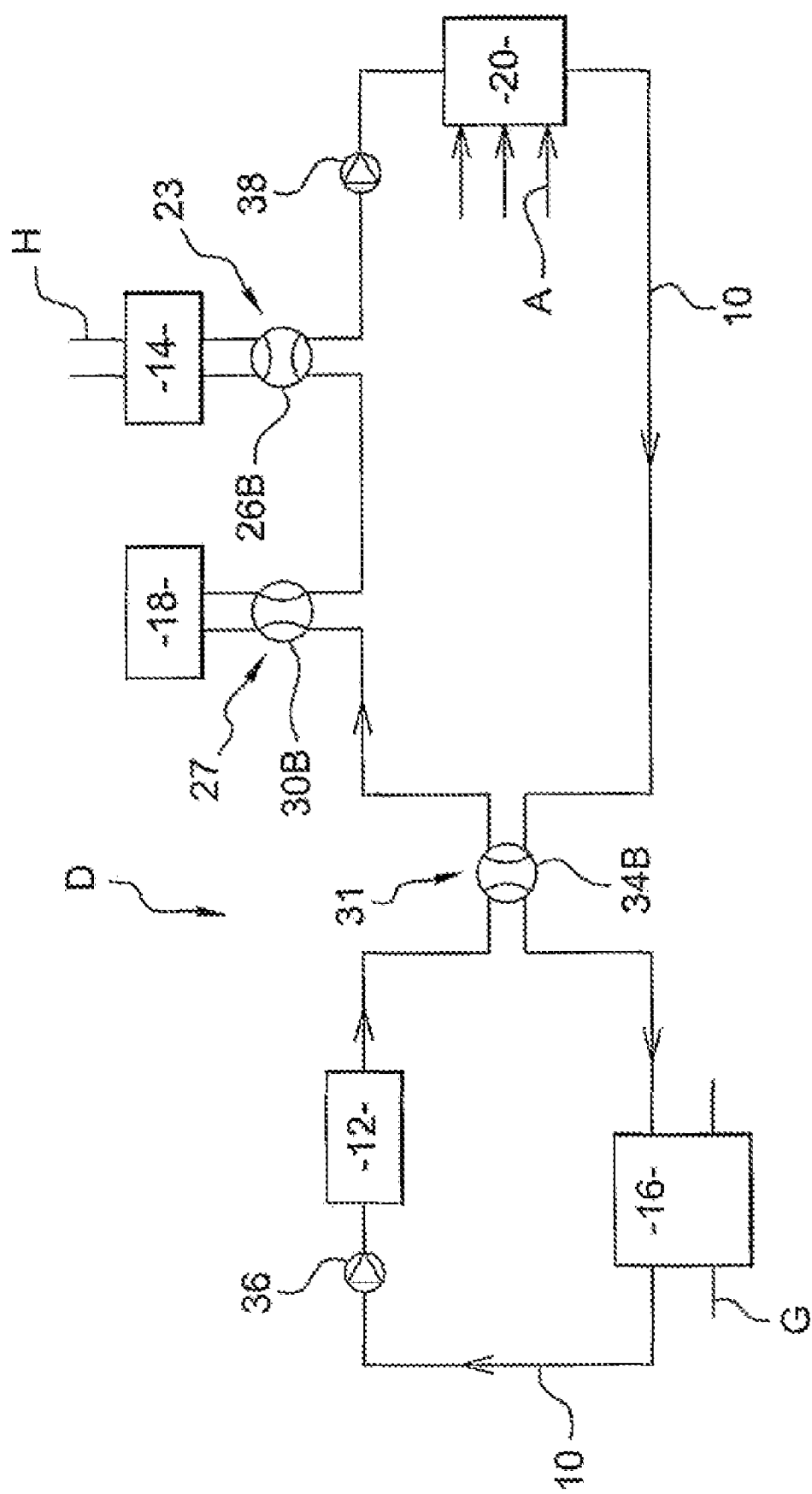
FIG. 3 is a schematic view of a device according to a second embodiment of the invention for controlling the temperature of fluids circulating in a heat engine vehicle.

The temperature control device D comprises a circuit 10 of heat-transfer liquid, intended to cool the heat engine 12 of the vehicle. The circuit 10 is thus connected to a portion of the engine 12 in which the heat-transfer liquid circulates.

The temperature control device D is intended to control the temperature of the lubricating oil of the heat engine 12, which circulates in a circuit H, as well as of the recirculated exhaust gases, which circulate in a circuit G.

To this effect, the device D comprises a first heat-transfer liquid/lubricating oil exchanger 14 and a second heat-transfer liquid/recirculated exhaust gases exchanger 16 connected to the heat-transfer liquid circuit 10.

The heat-transfer liquid circuit 10 is additionally connected to a heat source or to a heat sink supplying heat energy which is conventionally not put to use (heat energy of the exhaust gases, residual heat . . . ) The heat source or the heat sink comprises, for example, heat storage means 18 capable of exchanging heat with the heat-transfer liquid. Preferably, the heat storage means 18 comprise a chemical compound that stores or releases heat energy by changing phases and heat exchange means between the heat-transfer liquid and the chemical compound.

The storage means 18 can operate according to at least two modes, i.e., a heating mode in which the heat of the storage means 18 is transferred to the heat-transfer liquid of the circuit 10, and a regeneration mode in which the heat of the heat-transfer liquid is transferred to the storage means 18.

In the example of FIG. 1, the two exchangers 14 and 16 as well as the heat storage means 18 are connected in series in the heat-transfer liquid circuit 10, in the order: heat storage means 18, heat-transfer liquid/oil exchanger 14, heat-transfer liquid/recirculated exhaust gases exchanger 16, considering the direction of circulation of the heat-transfer liquid.

To make it possible to heat the passenger compartment of the vehicle, the heat-transfer liquid circuit 10 is connected to heat exchange means 20 between the heat-transfer liquid and the air A intended to circulate in this passenger compartment. These heat exchange means 20 comprise, for example, a conventional air heater.

The circuit 10 comprises multi-way valves which will be described below. Two channels are said to be of the same signs if they form two inlets (or two outlets) of the heat-transfer liquid. Two channels are said to be of opposed signs if they form, one an inlet, and the other, an outlet of the heat-transfer liquid.

To make it possible, if appropriate, to limit or prevent heat exchanges between the heat-transfer liquid and the oil, the heat-transfer liquid circuit 10 comprises derivation means 23 from the heat-transfer liquid/oil exchanger 14.

In the first embodiment of the invention, the derivation means 23 comprise a derivation branch 24 from the heat-transfer liquid/oil exchanger 14 and a three-way valve 26A. This valve 26A comprises two channels of the same signs forming an outlet of the heat-transfer liquid connected to the exchanger 14 and an outlet of the heat-transfer liquid connected to the derivation branch 24, and a channel of the sign opposed to that of the former forming an inlet of the heat-transfer liquid connected to the circuit 10, more particularly to the inlet of the heat exchange means 18.

In a first variant, the valve 26A can be placed at the outlet of the exchanger 14, and thus comprise two channels of the same signs forming an inlet of the heat-transfer liquid connected to the exchanger 14 and an inlet of the heat-transfer liquid connected to the derivation branch 24, and a channel of the sign opposed to that of the former forming an outlet of the heat-transfer liquid connected to the circuit 10, more particularly to the inlet of the heat exchange means 20.

In a second variant, the derivation branch 24 and the associated valve 26A can be replaced by a valve placed in the oil circuit H so as to make it possible to insulate the heat-transfer liquid/oil exchanger 14 from this oil circuit H.

In order to make it possible, if appropriate, to limit or prevent heat exchanges between the heat-transfer liquid and the heat storage means 18, the heat-transfer liquid circuit 10 comprises derivation means 27 from the heat storage means 18.

In the first embodiment of the invention, the derivation means 27 comprise a derivation branch 28 from these heat storage means 18 and a three-way valve 30A. This valve 30A comprises two channels of the same signs forming an outlet of the heat-transfer liquid connected to the inlet of the heat storage means 18 and an outlet of the heat-transfer liquid connected to the derivation branch 28, and a channel of the sign opposed to that of the former forming an inlet of the heat-transfer liquid connected to the circuit 10, more particularly to the outlet of the engine 12. As a variant, the valve 30A can be placed at the outlet of the exchanger 18, and thus comprise two channels of the same signs forming an inlet of the heat-transfer liquid connected to the heat storage means 18 and an inlet of the heat-transfer liquid connected to the derivation branch 28, and a channel of the sign opposed to that of the former forming an outlet of the heat-transfer liquid connected to the circuit 10, more particularly to the inlet of the exchanger 14.

To be able, if appropriate, to limit or prevent heat exchanges between the heat-transfer liquid and at least the engine 12, the heat-transfer liquid circuit 10 comprises derivation means 31 from the engine 12.

In the first embodiment of the invention, the derivation means 31 comprise a derivation branch 32 from this engine 12 and a three-way valve 34A. The valve 34A comprises two channels of the same signs forming an outlet of the heat-transfer liquid connected to the inlet of the engine 12 (via the exchanger 16) and an outlet of the heat-transfer liquid connected to the derivation branch 32, and a channel of the sign opposed to that of the former forming an inlet of the heat-transfer liquid connected to the circuit 10, more particularly to the outlet of the heat-transfer liquid/oil exchanger 14 (via the heat storage means 20).

According to a first variant, the valve 34A can comprise two channels of the same signs forming an outlet of the heat-transfer liquid connected directly to the inlet of the engine 12 and an outlet of the heat-transfer liquid connected to the derivation branch 32, and a channel of the sign opposed to that of the former forming an inlet of the heat-transfer liquid connected to the outlet of the heat-transfer liquid/re-circulated exhaust gases exchanger 16.

According to a second variant, the valve 34A can be placed at the outlet of the engine 12 and thus, comprise two channels of the same signs forming an inlet of the heat-transfer liquid connected to the outlet of the engine 12 and an inlet of the heat-transfer liquid connected to the derivation branch 32, and a channel of the sign opposed to that of the former forming an outlet of the heat-transfer liquid connected to the circuit 10, more particularly to the inlet of the exchanger 18.

In the example shown on FIG. 1, the inlet of the valve 34A is connected to the outlet of the heat exchange means 20, i.e., to the outlet of the exchanger 14 via the heat exchange means 20.

When the engine 12 is on, the heat-transfer liquid is circulated in the circuit 10 by means of a mechanical pump 36 driven by this engine 12. This mechanical pump 36 is connected to the circuit 10, for example, upstream of the engine 12.

When the engine 12 is off, the heat-transfer liquid can, if appropriate, be circulated in the circuit 10 by means of an electric pump 38 connected to the circuit 10, for example, between the heat-transfer liquid/oil exchanger 14 and the heat exchange means 20.

It will be noted that the electric pump 38 is capable of circulating the heat-transfer liquid in the derivation branch 32 of the engine 12.

If appropriate, the engine 12 being on, the mechanical pump 36 and the electric pump 38 can operate simultaneously.

Preferably, the temperature control device D according to this first embodiment of the invention comprises a sensor of the temperature of the heat-transfer liquid passing through the engine 12, a sensor of the temperature of the oil passing through the exchanger 14, and a sensor of the temperature of the chemical compound of the storage means 18. These sensors are not represented.

Certain aspects of the possible operation of the temperature control device D according to the invention will be described below.

1) Correlation Between the Operation of the Heat Storage Means 18 and the Operation of the Heat-Transfer Liquid/Oil Exchanger 14.

This correlation is obtained preferably by controlling, in accordance with the method schematically shown on FIG. 2, means for adjusting the amount of the heat-transfer liquid or of the oil circulating in the exchanger 14, such as the valve 26A.

According to this method, the oil temperature TH and the heat-transfer liquid temperature TL are raised, and it is determined whether the oil temperature TH is lower than a predetermined temperature T, for example, 110° C. (first condition 40).

If this first condition 40 is met, i.e., if the oil temperature TH is lower than T, it is determined whether the heat-transfer liquid temperature TL is higher than the oil temperature TH (second condition 42), which occurs in particular when the heat storage means 18 are in the heating mode. It will be noted that the heat storage means 18 are in the heating mode in particular during a period T1 of a few minutes following start-up of the engine, for example, 5 minutes.

If the second condition 42 is met, i.e., if the heat-transfer liquid temperature TL is higher than TH, the amounts of the heat-transfer liquid and of the oil circulating in the exchanger 14 are adjusted so as to promote heating of the oil by heat exchange with the relatively hot heat-transfer liquid (step 44). In the example shown, this adjustment is made by adjusting the valve 26A so as to circulate the heat-transfer liquid in the heat-transfer liquid/oil exchanger 14. This adjustment makes it possible to raise quickly the temperature of the lubricating oil of the engine 12. Indeed, the heat transmitted to the heat-transfer liquid by the heat transfer means 18 is transferred, at least in part, to the lubricating oil in the exchanger 14 (which is disposed downstream of the storage means 18 in the circuit 10).

If the second condition 42 is not met, i.e., if the heat-transfer liquid temperature TL is lower than TH (which can occur when the heat storage means 18 are in the regeneration mode), the amounts of the heat-transfer liquid and of the oil circulating in the exchanger 14 are adjusted so as to avoid or minimize the heat exchange between the oil and the relatively cold heat-transfer liquid, and thus cooling of this oil (step 48). In the example shown, this adjustment can be made by adjusting the valve 26A associated with the derivation branch 24 of the exchanger 14, so as to circulate the heat-transfer liquid in this derivation branch 24 or so as to distribute the heat-transfer liquid, for the most part, in the derivation branch 24 and for a smaller part, in the exchanger 14, so as to avoid any sign of ebullition of the residual heat-transfer liquid in the exchanger 14.

If the first condition 40 is not met, i.e., if the oil temperature TH is higher than T, the amounts of the heat-transfer liquid and of the oil circulating in the exchanger 14 are adjusted so as to promote cooling of the oil (down to, for example, temperature T) through heat exchange with the heat-transfer liquid (step 44). In the example shown, this adjustment is made by adjusting the valve 26A so as to circulate the heat-transfer liquid 10 in the heat-transfer liquid/oil exchanger 14.

2) Correlation Between the Operation of the Heat Storage Means 18 and the Operation of the Heat-Transfer Liquid/ Recirculated Exhaust Gases Exchanger 16.

The heat-transfer liquid is capable of circulating in both the heat-transfer liquid/recirculated exhaust gases exchanger 16 and the heat storage means 18, and this independently from the operation in heating mode or in regeneration mode of these storage means 18.

Indeed, the exhaust gases can be recirculated only when the engine 12 is on. This engine 12 being on, the heat storage means 18 are capable of being in heat exchange relationship with the heat-transfer liquid, on the one hand, when the heat storage means 18 are in heating mode, to give heat to the heat-transfer liquid (in particular during the period T1 of a few minutes following start-up of the engine), and on the other hand, when the heat storage means 18 are in regeneration mode, to remove heat from the heat-transfer liquid (usually during a period T2 of about ten minutes).

During the period T1 following start-up of the engine, the amount of nitrogen oxides produced is usually relatively low, so that heating of the heat-transfer liquid by the heat storage means 18 results in:

a beneficial effect on the temperature rise of the engine 12, which makes it possible to limit effectively the overconsumption by this engine during the period T1, and a detrimental effect, although a limited one, on the production of nitrogen oxides.

During the regeneration period T2 of the heat storage means 18, the cooling of the heat-transfer liquid by these storage means 18 has a beneficial effect of lowering the temperatures of the engine 12 and of the recirculated gases, which makes it possible to limit effectively the production of nitrogen oxides.

3) Correlation Between the Operation of the Heat Storage Means 18 and the Operation of the Heat Exchange Means 20 Between the Heat-Transfer Liquid and the Air of the Passenger Compartment.

In this section 3), various modes of operation of the temperature control device D are proposed, while the air of the passenger compartment is heated by means of the means 20 implementing a heat exchange between this air and the heat-transfer liquid.

a) Heat storage means 18 in regeneration mode and engine 12 on.

In this case, the amount of the heat-transfer liquid circulating in the heat storage means 18 is adjusted so as to avoid or minimize the heat exchange between the heat storage means 18 in regeneration mode and the relatively hot heat-transfer liquid. In the example shown, this adjustment can be made by adjusting the valve 30A associated with the derivation branch 28 of the heat storage means 18 so as to circulate the heat-transfer liquid in this derivation branch 28.

Thus, the heat of the heat-transfer liquid, which comes in particular from the engine 12, is not transferred to the heat storage means 18, such that the air of the passenger compartment can, by passing through the heat exchange means 20, remove a higher amount of heat from the heat-transfer liquid.

Since the heat exchange between the heat storage means 18 (in regeneration mode) and the relatively hot heat-transfer liquid is avoided or minimized, the desirable effect of limiting the production of nitrogen oxides, which is obtained during period T2 described above in paragraph 2, is not obtained here.

However, heating of the passenger compartment is desired generally in climatic conditions such that the temperature of the environment surrounding the vehicle is relatively low. In such climatic conditions, the problems of nitrogen oxides emissions into the environment are much less exacerbated.

b) Heat storage means 18 in heating mode and engine 12 off associated with a first category of condition(s).

This first category of condition(s) comprises for example a voluntary order to turn off the engine by the user.

In this case, the amount of heat-transfer liquid circulating in the heat storage means 18 is adjusted so as to avoid or minimize the heat exchange between the heat storage means 18 in heating mode and the heat-transfer liquid, in order to keep the heat remaining in storage until a next start-up of the engine 12. In the example shown, this adjustment can be made by adjusting the valve 30A associated with the derivation branch 28 of the heat storage means 18 so as to circulate the heat-transfer liquid in this derivation branch 28.

The heat-transfer liquid is circulated in the circuit 10 by means of the electric pump 38.

The air in the passenger compartment is heated when passing through the heat exchange means 20 so as to remove heat from the heat-transfer liquid, this heat coming from organs connected to circuit 10 other than the heat storage means 18, in particular the engine 12 which is still relatively hot.

c) Heat storage means 18 in heating mode and engine 12 operating at idle speed after a period at a higher speed.

In this case, in a manner similar to paragraph b) above, the heat exchange between the heat storage means 18 in heating mode and the heat-transfer liquid is avoided or minimized in order to keep the heat still in storage until a next return to a higher speed of the engine 12.

d) Heat storage means 18 in heating mode and engine 12 off associated with a second category of condition(s).

This second category of condition(s) comprises, for example, an order to turn off the engine by a computer of the vehicle (this type of turn-off is generally of short duration), a triggering of the emergency lights of the vehicle accompanying turn-off of the engine, a dysfunction of the vehicle necessitating turn-off of the engine, or an order to heat the air of the passenger compartment in anticipation of start-up of the engine, generally following a prolonged stop of the vehicle.

In this case, the amount of the heat-transfer liquid circulating in the heat storage means 18 is adjusted so as to promote heating of the heat-transfer liquid through heat exchange with these storage means 18 and thus to optimize the effectiveness of the heating of the air in the passenger compartment. In the example shown, this adjustment can be made by adjusting the valve 30A so as to circulate the heat-transfer liquid in the heat storage means 18.

The heat-transfer liquid is circulated in the circuit 10 by means of the electric pump 38.

The air in the passenger compartment is heated when passing through the heat exchange means 20 so as to remove heat from the heat-transfer liquid, this heat coming, for a relatively important part, from the heat storage means 18.

FIG. 3 shows a device D according to a second embodiment of the invention for controlling the temperature of fluids circulating in a heat engine vehicle, for example, of the diesel type.

On this FIG. 3, elements analogous to those of FIG. 1 are designated by the same references.

This embodiment differs from the previous in that each derivation branch 24, 28, and 32, as well as its associated valve 26A, 30A, and 34A, has been replaced by a four-way valve.

More precisely, in the device D according to the second embodiment, the derivation means 23 from the heat-transfer liquid/oil exchanger 14 comprise a four-way valve 26B equipped with:
  two channels of opposed signs connected to the exchanger 14,
  two channels of opposed signs connected to the heat-transfer liquid circuit 10, more precisely one channel connected to the inlet of the heat exchange means 20 and one channel connected to the outlet of the engine 12.

In addition, in the device D according to the second embodiment, the derivation means 27 from the heat storage means 18 comprise a four-way valve 30B equipped with:
  two channels of opposed signs connected to the heat storage means 18,
  two channels of opposed signs connected to the heat-transfer liquid circuit 10, more precisely, one channel connected to the outlet of the engine 12 and one channel connected to the inlet of the exchanger 14.

Finally, in the device D according to the second embodiment, the derivation means 31 of the engine 12 comprise a four-way valve 34B equipped with:
  two channels of opposed signs connected to the engine 12, more particularly to the outlet of the engine 12 and to the inlet of this engine 12 via the exchanger 16,
  two channels of opposed signs connected to the circuit 10, more particularly to the outlet of the heat exchange means 20 and to the inlet of the heat storage means 18.

The invention is not limited to the embodiments described.

In particular, the heat-transfer liquid circuit 10 can comprise additionally a derivation branch from the heat-transfer liquid/recirculated exhaust gases exchanger 16, controlled by a valve, in a manner similar to the derivation from the exchanger 14.

The heat storage means can be replaced by other means forming a heat source or a heat sink.

Additional means for heating the heat-transfer liquid, such as electric resistors or a burner (possibly programmable), can be provided on the circuit 10 between the outlet of the engine 12 and the heat exchange means 20.

The invention can be applied also to vehicles operating with a gasoline engine.

The invention claimed is:

1. Device for controlling the temperature of fluids circulating in a heat engine vehicle, of the type comprising a circuit in which a heat-transfer liquid circulates for cooling the heat engine, wherein the device is adapted to control the temperature of first and second fluids formed by lubricating oil of the heat engine of the vehicle and by recirculated exhaust gases, respectively, wherein said device comprises:
  a first heat-transfer liquid/lubricating oil exchanger,
  a second heat-transfer liquid/recirculated exhaust gases exchanger, the first and second exchangers being connected to a same heat-transfer liquid circuit,
  wherein the heat-transfer liquid circuit comprises derivation means from the heat-transfer liquid/oil exchanger, and
  wherein the heat-transfer liquid circuit comprises derivation means from the engine,
  wherein said derivation means from the engine bypasses a portion of the heat-transfer liquid circuit including the engine,
  and wherein the bypassed portion of the heat-transfer liquid circuit also includes the heat-transfer liquid/recirculated exhaust gases exchanger.

2. Device for controlling the temperature of fluids according to claim 1, wherein the heat-transfer liquid circuit is connected to a heat source or to a heat sink.

3. Device for controlling the temperature of fluids according to claim 2, wherein the heat source or the heat sink comprises heat storage means that can exchange heat with the heat-transfer liquid, in particular during a heating mode, in which the heat from the storage means is transferred to the heat-transfer liquid, and during a regeneration mode, in which the heat from the heat-transfer liquid is transferred to the storage means.

4. Device for controlling the temperature of fluids according to claim 3, wherein the heat storage means comprise a chemical compound that stores or releases heat energy by changing phases.

5. Device for controlling the temperature of fluids according to claim 2, wherein the heat-transfer liquid circuit comprises derivation means from the heat source or from the heat sink.

6. Device for controlling the temperature of fluids according to claim 5, wherein the derivation means from the heat source or from the heat sink comprise a derivation branch from the heat source or from the heat sink and a three-way valve comprising first and second channels of the same signs connected, one to the heat source or to the heat sink, and the other, to the derivation branch from the heat source or from the heat sink, and a third channel of the sign opposed to that of the former connected to the circuit.

7. Device for controlling the temperature of fluids according to claim 5, wherein the derivation means from the heat source or from the heat sink comprise a four-way valve comprising two channels of opposed signs connected to the heat source or to the heat sink and two channels of opposed signs connected to the heat-transfer liquid circuit.

8. Device for controlling the temperature of fluids according to claim 2, wherein the two exchangers and the heat source or the heat sink are connected in series in the heat-transfer liquid circuit, in the order: heat source or heat sink, heat-transfer liquid/oil exchanger, heat-transfer liquid/recirculated exhaust gases exchanger, considering the direction of circulation of the heat-transfer liquid in the circuit.

9. Device for controlling the temperature of fluids according to claim 1, wherein the derivation means from the heat-transfer liquid/oil exchanger comprise a derivation branch from the heat-transfer liquid/oil exchanger and a three-way valve comprising first and second channels of the same signs connected, one to the exchanger, and the other, to the derivation branch from the heat-transfer liquid/oil exchanger, and a third channel of the sign opposed to that of the former connected to the circuit.

10. Device for controlling the temperature of fluids according to claim 1, wherein the derivation means from the heat-transfer liquid/oil exchanger comprise a four-way valve comprising two channels of opposed signs connected to the heat-transfer liquid/oil exchanger and two channels of opposed signs connected to the heat-transfer liquid circuit.

11. Device for controlling the temperature of fluids according to claim 1, wherein the derivation means from the engine comprise a derivation branch from this engine and a three-way valve comprising first and second channels of the same signs connected, one to the engine, and the other, to the derivation branch of this engine, and a third channel of the sign opposed to that of the former connected to the circuit.

12. Device for controlling the temperature of fluids according to claim 1, wherein the derivation means from the engine comprise a four-way valve comprising two channels of opposed signs connected to the engine and two channels of opposed signs connected to the circuit.

13. Device for controlling the temperature of fluids according to claim 1, wherein the heat-transfer liquid circuit is connected additionally to heat exchange means between the heat-transfer liquid and the air of a passenger compartment of the vehicle.

14. Device for controlling the temperature of fluids according to claim 1, wherein the heat-transfer liquid circuit is connected additionally to an electric pump capable of circulating the heat-transfer liquid in at least a portion of the circuit, in particular when the engine is off.

15. Device for controlling the temperature of fluids according to claim 1, further comprising a derivation branch from the heat-transfer liquid/recirculated exhaust gases exchanger.

16. Method for controlling the temperature of fluids implemented by the device according to claim 1, which comprises the following steps:

raising the temperatures of the oil and of the heat-transfer liquid and determining whether the temperature of the oil is lower than a predetermined temperature (first condition), if this first condition is met, determining whether the temperature of the heat-transfer liquid is higher than the temperature of the oil (second condition), If the second condition is met, adjusting the amounts of the heat-transfer liquid and of the oil circulating in the exchanger so as to promote heating of the oil through heat exchange with the relatively hot heat-transfer liquid, If the second condition is not met, adjusting the amounts of the heat-transfer liquid and of the oil circulating in the exchanger so as to avoid or minimize the heat exchange between the oil and the relatively cold heat-transfer liquid, if the first condition is not met, adjusting the amounts of the heat-transfer liquid and of the oil circulating in the exchanger so as to promote cooling of the oil.

* * * * *